(12) United States Patent
Sodhi et al.

(10) Patent No.: US 10,557,074 B2
(45) Date of Patent: Feb. 11, 2020

(54) METHODS OF CEMENTING A WELLBORE WITH THE USE OF AN OIL SWELLABLE ELASTOMER

(71) Applicants: Thomas S. Sodhi, New Caney, TX (US); Shannon E. Bryant, Tomball, TX (US)

(72) Inventors: Thomas S. Sodhi, New Caney, TX (US); Shannon E. Bryant, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/022,981

(22) Filed: Jun. 29, 2018

(65) Prior Publication Data

US 2020/0002596 A1    Jan. 2, 2020

(51) Int. Cl.
*C09K 8/40* (2006.01)
*E21B 33/16* (2006.01)

(52) U.S. Cl.
CPC ............... *C09K 8/40* (2013.01); *E21B 33/16* (2013.01)

(58) Field of Classification Search
CPC .................................. C09K 8/40; E21B 33/16
See application file for complete search history.

(56) References Cited

U.S. PATENT DOCUMENTS

| | | | |
|---|---|---|---|
| 4,633,950 A | 1/1987 | Delhommer et al. | |
| 5,866,517 A | 2/1999 | Carpenter et al. | |
| 6,060,434 A * | 5/2000 | Sweatman | C09K 8/50 507/216 |
| 6,518,224 B2 | 2/2003 | Wood | |
| 6,566,310 B2 | 5/2003 | Chan | |
| 7,228,915 B2 | 6/2007 | Thomson | |
| 7,717,180 B2 | 5/2010 | Badalamenti et al. | |
| 7,841,417 B2 | 11/2010 | Allison et al. | |
| 8,030,253 B2 | 10/2011 | Roddy et al. | |
| 8,490,707 B2 | 7/2013 | Robisson et al. | |
| 8,592,352 B2 | 11/2013 | Karcher et al. | |
| 9,650,559 B2 | 5/2017 | Nelson | |
| 2009/0308611 A1* | 12/2009 | Santra | C04B 28/02 166/293 |
| 2009/0312445 A1* | 12/2009 | Roddy | C04B 38/10 521/83 |
| 2010/0193244 A1* | 8/2010 | Hoskins | C09K 8/035 175/5 |
| 2011/0094746 A1* | 4/2011 | Allison | C09K 8/40 166/308.5 |
| 2014/0166285 A1* | 6/2014 | Santra | C04B 28/02 166/292 |
| 2014/0357533 A1* | 12/2014 | Wells | C09K 8/34 507/126 |
| 2016/0017686 A1 | 1/2016 | Ferg | |
| 2016/0040058 A1 | 2/2016 | Patil et al. | |
| 2016/0108305 A1* | 4/2016 | Murphy | C09K 8/44 507/224 |
| 2016/0264838 A1 | 9/2016 | Nelson | |
| 2016/0265306 A1* | 9/2016 | Nelson | C09K 8/40 |
| 2017/0298270 A1* | 10/2017 | Shindgikar | C09K 8/90 |

* cited by examiner

*Primary Examiner* — Zakiya W Bates
*Assistant Examiner* — Crystal J Miller
(74) *Attorney, Agent, or Firm* — Cantor Colburn LLP

(57) ABSTRACT

A method of cementing a wellbore penetrating a subterranean formation, the method comprising: injecting into the wellbore an oil-based fluid; injecting into the wellbore a cement spacer fluid comprising an aqueous carrier, an oil swellable elastomer, and a viscosifier; contacting the oil-based fluid with the cement spacer fluid to swell the oil swellable elastomer in the cement spacer fluid; injecting a cement slurry into the wellbore; and allowing the cement slurry to set.

12 Claims, No Drawings

METHODS OF CEMENTING A WELLBORE WITH THE USE OF AN OIL SWELLABLE ELASTOMER

BACKGROUND

Plugging oil or gas wells with a cement plug is a common operation in the art. In general, one of the goals of plug cementing is to secure a stable and effective seal in a designated location of the wellbore. In other cases, a cement plug may be used to provide a base for initiating a derivation or kick-off when a directional change in drilling is desired.

Cement plugs are often constructed by pumping a cement slurry down a drill pipe. The pumped cement slurry then displaces a wellbore fluid such as a drilling fluid, and hardens forming a cement plug. Because a cement slurry is usually denser than a drilling fluid, the lighter drilling fluid tends to migrate upward and through the cement slurry. At the same time, the heavier cement slurry tends to fall in the wellbore as it sets up. This phenomenon is known as density swapping of fluids within the wellbore. Density swapping can ultimately lead to the plug failing to set in its intended place, and the subsequent mixing of wellbore fluids with the plug slurry can also have detrimental effects on the intended performance of the set cement.

Cement spacers can be used to aid separating drilling fluids from cement slurries. However, some known cement spacers are not entirely effective, and allow mixing and remixing of the fluids that they are designed to separate. Contamination of the cement slurries can slow or prevent setting or otherwise comprise the integrity of the cement plug. Accordingly, there remains a need in the art for alternative cement spacer fluids and methods of cementing a wellbore using the alternative cement spacer fluids.

BRIEF DESCRIPTION

A method of cementing a wellbore penetrating a subterranean formation, the method comprising: injecting into the wellbore an oil-based fluid; injecting into the wellbore a cement spacer fluid comprising an aqueous carrier, an oil swellable elastomer, and a viscosifier; contacting the oil-based fluid with the cement spacer fluid to swell the oil swellable elastomer in the cement spacer fluid; injecting a cement slurry into the wellbore; and allowing the cement slurry to set.

A cement spacer fluid comprising: about 75 to about 100 wt % of an aqueous carrier comprising water; about 5 to about 65 wt % of an oil swellable elastomer particles comprising styrene ethylene butadiene styrene, ethylene propylene diene monomer, styrene butadiene rubber, synthetic rubber based on polychloroprene, natural rubber, butadiene rubber, fluorosilicone rubber, isobutylene-isoprene rubber, or a combination comprising at least one of the foregoing oil swellable elastomer particles; and about 0.5 to about 50 wt % of a viscosifier, each based on the weight of water in the cement spacer fluid.

DETAILED DESCRIPTION

An improved method for cementing a wellbore is disclosed. The method uses a cement spacer fluid comprising an aqueous carrier, an oil swellable elastomer, and a viscosifier. The spacer fluid is compatible with oil-based fluids and cement slurries, and can effectively prevent density swapping between the two in a wellbore. Without being bound by theory, it is believed that the oil swellable elastomer in the spacer fluid swells upon contact with the oil-based fluids. The swelled elastomer effectively prevents mixing of the oil-based fluids with a cement slurry, thus aids the placement of the cement slurry and plug at the desired location. Additionally, the method disclosed herein can reduce cement set-up times by preventing or minimizing the risk of catastrophic failure due to contamination of the cement plug.

As used herein, oil swellable elastomers include elastomers that can swell when contacted with an oil-based fluid by reacting with or absorbing oil. Non-limiting examples of such oil swellable elastomers include styrene ethylene butadiene styrene, ethylene propylene diene monomer, styrene butadiene rubber, synthetic rubber based on polychloroprene, natural rubber, butadiene rubber, fluorosilicone rubber, isobutylene-isoprene rubber, or a combination comprising at least one of the foregoing elastomers. Styrene ethylene butadiene styrene is specifically mentioned.

The oil swellable elastomers can be present in the spacer fluids in a particulate form. The shape of the oil swellable polymer particles before addition to an aqueous carrier fluid, or after swelling is not critical, and can be regular or irregular, for example spherical, ovoid, polyhedral, or fibrous, stranded, or braided. In an embodiment, the oil swellable elastomer particles are in the form of beads having an approximately spherical shape.

In some embodiments, the oil swellable elastomer particles in the cement spacer fluids have a number average particle size of about 0.01 to about 100,000 micrometers, preferably about 10 to about 10,000 micrometers, or about 100 to about 1,000 micrometers.

The oil swellable elastomers are present in an amount effective to isolate the oil-based fluids from the cement slurries. The spacer fluids can contain about 0.5 to 24 pounds of the oil swellable elastomers per gallon of the cement spacer fluids (ppg), preferably about 1 to about 12 ppg, more preferably about 2 to about 6 ppg of the oil swellable elastomers.

In addition to the oil swellable elastomers, cement spacer fluids can further comprise a viscosifier. The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth)acrylic acid and (meth)acrylamide, and $C_{1-8}$ alkyl poly(meth)acrylates; or clays such as bentonite, sepiolite, and attapulgite, and the like; or a combination comprising at least one of the foregoing viscosifiers.

The weight ratio of oil-swellable elastomers to the viscosifiers can be about 99:1 to about 80:20, for example about 97:3 to about 85:15, preferably about 95:5 to about 90:10.

The cement isolation fluids can further comprise an aqueous carrier to carry the oil-swellable elastomers to the desired location in the wellbore. The aqueous carrier can be fresh water, brine (including seawater), an aqueous acid (for example a mineral acid or an organic acid), an aqueous base, or a combination comprising at least one of the foregoing. It will be appreciated that other polar liquids such as alcohols and glycols, alone or together with water, may be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$) to increase the density of the brine, such as about 10.6 pounds per gallon of $CaCl_2$) brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$), $CaBr_2$, $ZnBr_2$, $NH_4Cl$, sodium formate, cesium formate, and combinations comprising at least one of the foregoing. The salt can be present in the brine in an amount of about 0.5 to about 50 weight percent (wt. %), specifically about 1 to about 40 wt. %, and more specifically about 1 to about 25 wt. %, based on the weight of the carrier fluid.

The cement spacer fluids can further comprise other components known for use in cement spacers, for example a viscosifier crosslinker, a pH control agent, a surfactant, a weighting agent, a lubricant, a fluid loss agent, a clay stabilizer, a biocide, an acid, a corrosion inhibitor, a friction reducer, an oxygen scavenger, a foaming agent, a gel stabilizer, or a combination comprising at least one of the foregoing. These additional components are selected to avoid imparting unfavorable characteristics to the cement spacers, to avoid damage to equipment in contact with the compositions, and to avoid damaging the wellbore or subterranean formation.

In an embodiment, a crosslinker for the viscosifier can be present, for example a borate, titanate, zirconate, aluminate, or chromate crosslinker, or a combination comprising at least one of the foregoing.

The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination comprising at least one of the foregoing. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination comprising at least one of the foregoing. Specific examples of pH control agents, particularly those used in combination with borate crosslinking agents include alkaline metal and alkaline earth metal hydroxides and carbonates such as sodium hydroxide and sodium carbonate, metal oxides such as magnesium oxide, sodium sesquicarbonate, and amines such as hydroxyalkyl amines, anilines, pyridines, pyrimidines, quinolines, and pyrrolidines, and carboxylates such as acetates and oxalates.

Weighting agents are high-specific gravity and finely divided solid materials used to increase density, for example silica flour, sand, fly ash, calcium carbonate, barite, hematite, ilemite, siderite, and the like. Preferred weighting agents are sand and silica flour.

Surfactants can increase the compatibility of the cement spacer fluids, the cement slurry, or the drilling fluid. The surfactant can be anionic, cationic, zwitterionic, or non-ionic. Other useful surfactants include those having poly (alkylene glycol) side chains, fatty acids, or fluorinated groups such as perfluorinated sulfonic acids grafted to the polymer backbone. Polymer backbones include those based on a polyester, a poly(meth)acrylate, a polystyrene, a poly (styrene-(meth)acrylate), a polycarbonate, a polyamide, a polyimide, a polyurethane, a polyvinyl alcohol, or a copolymer comprising at least one of these polymeric backbones.

The cement spacer fluids can be a gel, a liquid, or a foam. The carrier fluid can be foamed with a liquid hydrocarbon or a gas or liquefied gas such as nitrogen or carbon dioxide. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in fracturing low pressure or water sensitive formations.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine), cellulose derivatives, and polystyrene sulfonate. In some embodiments, the same polymer functions as both a viscosifier and a fluid-loss control agent.

The clay stabilizer prevents the clay downhole from swelling under contact with the cement spacer or applied fracturing pressure and can be, for example, a quaternary amine, a brine (e.g., KCl brine), choline chloride, tetramethyl ammonium chloride, and the like.

A biocide prevents injection of a microbe (e.g., bacteria) downhole by eliminating or reducing bacteria in the cement spacer, thus reducing production of, e.g., sour gas.

The various properties of the cement spacer fluids can be varied and adjusted according to well control and compatibility parameters associated with the particular oil-based fluid and the cement slurry with which it is associated. For example, the viscosity of the spacer fluid can be varied over a wide range such as an apparent viscosity (AV) from about 1 to about 200 centipoise (cP) or about 1 to about 80 cP when measured with a benchtop viscometer such as an Ofite M900 rheometer at 23° C. at 300 revolutions per minute (rpm) and performed according to American Petroleum Institute standard API RP-39.

The density of the spacer fluid can vary over a wide range. In an embodiment, the spacer fluids are heavier (denser) than the preceding fluid (e.g., a 12 ppg drilling fluid and then a 14 ppg spacer and then a 16 ppg cement). In another embodiment, the spacer fluids are lighter than the preceding fluids. Because of the presence of oil swellable elastomers, the lighter spacer fluids can also effectively prevent or mitigate the mixing of the cement slurries with oil-based wellbore fluids.

The cement spacer fluids can be premixed or are injected without mixing, e.g., injected "on the fly" where the components are combined as the cement spacers are being injected downhole. The order of addition can be varied and the time of injecting each component is the same or different.

In general, an oil-based fluid is first injected into a wellbore, followed by a cement spacer fluid as disclosed herein. Then a cement slurry is injected into the wellbore (optionally with a "lead slurry" or a "tail slurry"); and allowed to set. The cement spacer fluid is used to hold the cement plug where it is placed and to prevent density swapping of the cement slurry with the oil-based fluid after slurry placement. Although usually the cement spacer fluid is injected before the cement slurry, but it is possible to also use cement spacer fluid to isolate the cement slurry from following drilling fluids, alone or with another isolation fluid. Thus, in another embodiment the method includes injecting a first cement spacer fluid into the wellbore. A cement slurry is then injected into the wellbore, followed by injecting a second cement spacer fluid. As the first and second cement spacer fluid contact the cement slurry, on either side, the slurry is sandwiched by the first and the second cement spacer fluids. The first and second cement spacer fluids can be different or the same.

The oil-based fluid can be a drilling fluid. It will be appreciated that as used herein, the term "drilling fluid" also encompasses "drill-in fluids" and "completion fluids". Examples of drilling fluids include all-oil based or a water-in-oil emulsion. The drilling fluid can comprise a diesel oil, a paraffin oil, a vegetable oil, a soybean oil, a mineral oil, an aliphatic solvent, an aromatic solvent, or a synthetic oil, or a combination comprising at least one of the foregoing.

The cement slurry can include any cementitious material that sets and hardens by reaction with water, and is suitable for forming a set cement downhole, including mortars and concretes. Suitable hydraulic cements, including mortars and concretes, include those typically employed in a wellbore environment, for example those comprising calcium, aluminum, silicon, oxygen, or sulfur. Such hydraulic cements include, but are not limited to, Portland cements, pozzolana cements, gypsum cements, high alumina content cements, silica cements, and high alkalinity cements. Portland cements are particularly useful. In some embodiments, the Portland cements that are suited for use are classified as Class A, B, C, G, and H cements according to American Petroleum Institute, API Specification for Materials and Testing for Well Cements. The cements as used herein encompass various concretes by the further addition of aggregates, such as a coarse aggregate made of gravel or crushed rocks such as chert, quartzite, granite, or a fine aggregate such as sand or crushed sand.

The cement slurries can further comprise other components known for use in cementing, for example an accelerator to reduce setting time, a setting retardant to extend setting time, a fluid loss control agent, an extender to lower density, a foaming agent to reduce density, a weighting agent to increase density, a dispersant to reduce viscosity, other fluid loss control agents, thixotropic agents, a bridging agent (e.g., gilsonite or cellophane flakes), or a combination comprising at least one of the foregoing.

The cement slurries are pumpable. A pumpable cement slurry can have a viscosity lower than 1000 mPa-s at a shear rate of 100 $s^{-1}$. The cement slurries can be a low-density cement slurry or a high-density cement slurry. While the density of a low-density cement slurry such as a scavenger can vary widely depending on downhole conditions, such densities can include about 5 to about 12 pounds per gallon (ppg) when foamed. When unfoamed the density of a scavenger or low-density cement slurry can vary with such densities between about 9 up to about 15 pounds per gallon, or about 10 to about 14 pounds per gallons, or about 11 up to about 13 pounds per gallon. The high density cement slurries can have a density of about 15 to about 25 pounds per gallon.

The cement slurries can be used to form downhole components, including various casings, seals, plugs, packings, liners, and the like. In an embodiment the component is a plug, including a temporary cement plug, permanent cement plug, or a whipstock cement plug. The whipstock plug can be used to kick off from a vertical wellbore when a directional change in drilling is desired.

Use of the cement spacer fluids as disclosed herein provides a number of benefits. The compositions are stable at high wellbore temperatures. In one benefit, the cement spacer fluids suppress or minimize mixing and remixing of drilling fluid and cement slurries, fluid density swapping, and drilling mud contamination to the leading edge of the cement slurry. Another benefit is enhanced segregation performance with respect to separating wellbore fluids, resulting in streamlined and easier placement of the cement plug at its intended place in the wellbore. Additionally, the methods/compositions disclosed herein prevent or minimize the risk of cement plug set-up failures. Thus, the methods and spacer fluid compositions beneficially improve the overall quality of plug cementing operations.

EXAMPLES

Fluids A and B were made. For fluid A, 3 grams of diutan gum was mixed with 300 grams of water. For fluid B, 3 grams of diutan and 45 grams of styrene ethylene butadiene styrene were mixed with 300 grams of water. Fluid B contained 8.13 ppg of styrene ethylene butadiene styrene. The viscosities of fluids A and B were measured at room temperature (23° C.) with a benchtop viscometer. The results are shown in Table 1. As shown in Table 1, fluid B has a very low viscosity, which is similar to that of fluid A.

TABLE 1

| | Fluid A Viscosity (cP) | | Fluid B Viscosity (cP) | |
|---|---|---|---|---|
| RPM | Up | Down | Up | Down |
| 3 | 36 | 40 | 42 | 55 |
| 6 | 40 | 44 | 54 | 58 |
| 10 | 44 | 47 | 60 | 62 |
| 20 | 50 | 52 | 65 | 66 |
| 30 | 55 | 55 | 68 | 69 |
| 6960 | 61 | 59 | 72 | 72 |
| 100 | 64 | 64 | 74 | 75 |
| 200 | 68 | 68 | 81 | 81 |
| 300 | 72 | — | 87 | — |

Approximately 200 ml of 13.6 ppg oil-based mud (OBM) was poured into a 1,000 ml cylinder. Approximately 200 ml of a fluid containing water, diutan, and 6.6 ppg of styrene ethylene butadiene styrene (fluid C) was poured on top of OMB. Then approximately 200 ml of 16.5 ppg cement slurry was poured on top of fluid C. The cylinder was placed at 45° and 90° angles. A visual inspection of the fluids indicates that there was no mixing between the OBM and the cement slurry. Similar results were obtained when a settling tube was first charged with 50 ml of the OMB, then 100 ml of the fluid C, and finally 50 ml of the cement slurry. In contrast, when fluid C was not used, significant mixing between the OBM and cement slurry was observed.

Set forth below are various embodiments of the disclosure.

Embodiment 1

A method of cementing a wellbore penetrating a subterranean formation, the method comprising: injecting into the wellbore an oil-based fluid; injecting into the wellbore a cement spacer fluid comprising an aqueous carrier, an oil swellable elastomer, and a viscosifier; contacting the oil-based fluid with the cement spacer fluid to swell the oil swellable elastomer in the cement spacer fluid; injecting a cement slurry into the wellbore; and allowing the cement slurry to set.

Embodiment 2

The method as in any prior embodiment, wherein injecting the cement slurry is subsequent to injecting the cement spacer fluid.

Embodiment 3

The method as in any prior embodiment, wherein the cement spacer fluid prevents density swapping between the oil-based fluid and the cement slurry.

Embodiment 4

The method as in any prior embodiment, wherein the oil swellable elastomer in the cement spacer fluid swells forming a barrier between the oil-based fluid and the cement slurry.

Embodiment 5

The method as in any prior embodiment, wherein the oil swellable elastomer is present in the form of particles.

Embodiment 6

The method as in any prior embodiment, wherein the oil swellable elastomer particles have a number average particle size of about 100 to about 1,000 micrometers.

Embodiment 7

The method as in any prior embodiment, wherein the oil swellable elastomer is present in an amount effective to isolate the oil-based fluid from the cement slurry.

Embodiment 8

The method as in any prior embodiment, wherein the cement spacer fluid comprises about 75 to about 100 wt % of the aqueous carrier, about 5 to about 65 wt % of the oil swellable elastomer, and about 0.5 to about 50 wt % of the viscosifier, each based on the weight of water in the cement spacer fluid.

Embodiment 9

The method as in any prior embodiment, wherein the oil swellable elastomer comprises styrene ethylene butadiene styrene, ethylene propylene diene monomer, styrene butadiene rubber, synthetic rubber based on polychloroprene, natural rubber, butadiene rubber, fluorosilicone rubber, isobutylene-isoprene rubber, or a combination comprising at least one of the foregoing elastomers.

Embodiment 10

The method as in any prior embodiment, wherein the viscosifier comprises guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, C1-8 alkyl poly(meth)acrylates, clays, or a combination comprising at least one of the foregoing viscosifiers.

Embodiment 11

The method as in any prior embodiment, wherein the oil swellable elastomer comprises styrene ethylene butadiene styrene.

Embodiment 12

The method as in any prior embodiment, wherein the aqueous carrier comprises at least water or brine.

Embodiment 13

The method as in any prior embodiment, wherein the oil-based fluid is a drilling fluid.

Embodiment 14

The method as in any prior embodiment, wherein the drilling fluid is all-oil based or a water-in-oil emulsion; and the drilling fluid comprises a diesel oil, a paraffin oil, a vegetable oil, a soybean oil, a mineral oil, an aliphatic solvent, an aromatic solvent, or a synthetic oil, or a combination comprising at least one of the foregoing.

Embodiment 15

The method as in any prior embodiment, wherein the cement slurry sets forming a cement plug.

Embodiment 16

A cement spacer fluid comprising: about 75 to about 100 wt % of an aqueous carrier comprising water or brine; about 5 to about 65 wt % of an oil swellable elastomer particles comprising styrene ethylene butadiene styrene, ethylene propylene diene monomer, styrene butadiene rubber, synthetic rubber based on polychloroprene, natural rubber, butadiene rubber, fluorosilicone rubber, isobutylene-isoprene rubber, or a combination comprising at least one of the foregoing oil swellable elastomer particles; and about 0.5 to about 50 wt. % of a viscosifier, each based on the weight of water in the cement spacer fluid.

Embodiment 17

The cement spacer fluid as in any prior embodiment, wherein the oil swellable elastomer comprises styrene ethylene butadiene styrene.

Embodiment 18

The cement spacer fluid as in any prior embodiment, wherein the viscosifier comprises guar gums, guar derivatives, hydratable polysaccharides, xanthan gum, galactomannan gums, glucomannan gums, cellulose, cellulose derivatives, poly((meth)acrylic acid)s, poly((meth)acrylamides), copolymers of (meth)acrylic acid and (meth)acrylamide, C1-8 alkyl poly(meth)acrylates, or clays or a combination comprising at least one of the foregoing viscosifiers.

Embodiment 19

The cement spacer fluid as in any prior embodiment, wherein the viscosifier comprises diutan gum.

All ranges disclosed herein are inclusive of the endpoints, and the endpoints are independently combinable with each other. As used herein, "combination" is inclusive of blends, mixtures, alloys, reaction products, and the like. The size of the particles refers to the largest dimension of the particles and can be determined by high resolution electron or atomic force microscope technology. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:

1. A method of cementing a wellbore penetrating a subterranean formation, the method comprising:
   injecting into the wellbore an oil-based fluid;
   injecting into the wellbore a cement spacer fluid comprising an aqueous carrier, an oil swellable elastomer, and a viscosifier, the oil swellable elastomer comprising styrene ethylene butadiene styrene, and the viscosifier comprising diutan gum;
   contacting the oil-based fluid with the cement spacer fluid to swell the oil swellable elastomer in the cement spacer fluid;
   injecting a cement slurry into the wellbore; and
   allowing the cement slurry to set,
   wherein the cement spacer fluid comprises about 0.5 to about 24 pounds of the oil swellable elastomer per gallon of the cement spacer fluid; and
   the weight ratio of the oil-swellable elastomer to the viscosifier is about 95:5 to about 90:10.

2. The method of claim 1, wherein injecting the cement slurry is subsequent to injecting the cement spacer fluid.

3. The method of claim 1, wherein the cement spacer fluid prevents mixing of the oil-based fluid with the cement slurry.

4. The method of claim 1, wherein the oil swellable elastomer in the cement spacer fluid swells forming a barrier between the oil-based fluid and the cement slurry.

5. The method of claim 4, wherein the oil swellable elastomer is present in the form of particles.

6. The method of claim 5, wherein the oil swellable elastomer particles have a number average particle size of about 100 to about 1,000 micrometers.

7. The method of claim 4, wherein the oil swellable elastomer is present in an amount effective to isolate the oil-based fluid from the cement slurry.

8. The method of claim 1, wherein the aqueous carrier comprises at least water or brine.

9. The method of claim 1, wherein the oil-based fluid is a drilling fluid.

10. The method of claim 9, wherein the drilling fluid is all-oil based or a water-in-oil emulsion; and the drilling fluid comprises a diesel oil, a paraffin oil, a vegetable oil, a soybean oil, a mineral oil, an aliphatic solvent, an aromatic solvent, or a synthetic oil, or a combination comprising at least one of the foregoing.

11. The method of claim 1, wherein the cement slurry sets forming a cement plug.

12. The method of claim 1, wherein the cement spacer fluid comprises about 1 to about 6 pounds of the oil swellable elastomer per gallon of the cement spacer fluid.

* * * * *